United States Patent
Spalka et al.

(10) Patent No.: US 9,558,366 B2
(45) Date of Patent: Jan. 31, 2017

(54) COMPUTER SYSTEM FOR STORING AND RETRIEVAL OF ENCRYPTED DATA ITEMS, CLIENT COMPUTER, COMPUTER PROGRAM PRODUCT AND COMPUTER-IMPLEMENTED METHOD

(71) Applicant: Compugroup Medical SE, Koblenz (DE)

(72) Inventors: Adrian Spalka, Koblenz (DE); Jan Lehnhardt, Koblenz (DE)

(73) Assignee: Compugroup Medical SE, Koblenz (DE)

( * ) Notice: Subject to any disclaimer, the term of this patent is extended or adjusted under 35 U.S.C. 154(b) by 222 days.

(21) Appl. No.: 14/275,486

(22) Filed: May 12, 2014

(65) Prior Publication Data

US 2016/0117521 A1  Apr. 28, 2016

(51) Int. Cl.
- H04L 9/32 (2006.01)
- G06F 21/62 (2013.01)
- H04L 29/06 (2006.01)

(52) U.S. Cl.
CPC ......... *G06F 21/6227* (2013.01); *H04L 63/061* (2013.01); *H04L 63/0815* (2013.01); *H04L 63/126* (2013.01)

(58) Field of Classification Search
CPC .. H04L 63/061; H04L 63/0815; H04L 63/126; G06F 17/30867; G06F 21/6227
USPC ........................................................ 713/171
See application file for complete search history.

(56) References Cited

U.S. PATENT DOCUMENTS

| | | | |
|---|---|---|---|
| 7,069,227 B1* | 6/2006 | Lintel, III | G06F 19/328 705/2 |
| 8,266,435 B2 | 9/2012 | Spalka et al. | |
| 8,626,749 B1* | 1/2014 | Trepetin | H04L 9/002 707/722 |
| 8,811,620 B2* | 8/2014 | Chaves | G06F 21/6218 380/277 |
| 9,275,250 B2* | 3/2016 | Yoshino | H04L 9/008 |
| 9,355,271 B2* | 5/2016 | Yavuz | G06F 17/3033 |

(Continued)

FOREIGN PATENT DOCUMENTS

| WO | 00/42491 A1 | 7/2000 |
|---|---|---|
| WO | 03/044637 A1 | 5/2003 |

OTHER PUBLICATIONS

Al-Sakran, H.O. et al., "Efficient Cryptographic Technique for Securing and Accessing Outsourced Data," (IJCSIS) International Journal of Computer Science and Information Security,vol. 9, No. 8, Aug. 2011, Management Information Systems Department King Saud University Riyadh, Saudi Arabia; 6 pages.

(Continued)

*Primary Examiner* — Samson Lemma

(57) ABSTRACT

A computer system is disclosed herein for storage and retrieval of encrypted data items, such as for storing encrypted data items in the cloud, as well as a respective client computer, client computer system, computer program product and computer-implemented method. Embodiments of the disclosed computer system allow for searching for encrypted data items stored in a database based on functional values associated with the data items. The retrieval of the data items from the database can be performed without knowledge of a respective cryptographic key by the database.

12 Claims, 9 Drawing Sheets

(56) References Cited

U.S. PATENT DOCUMENTS

Figure 1:
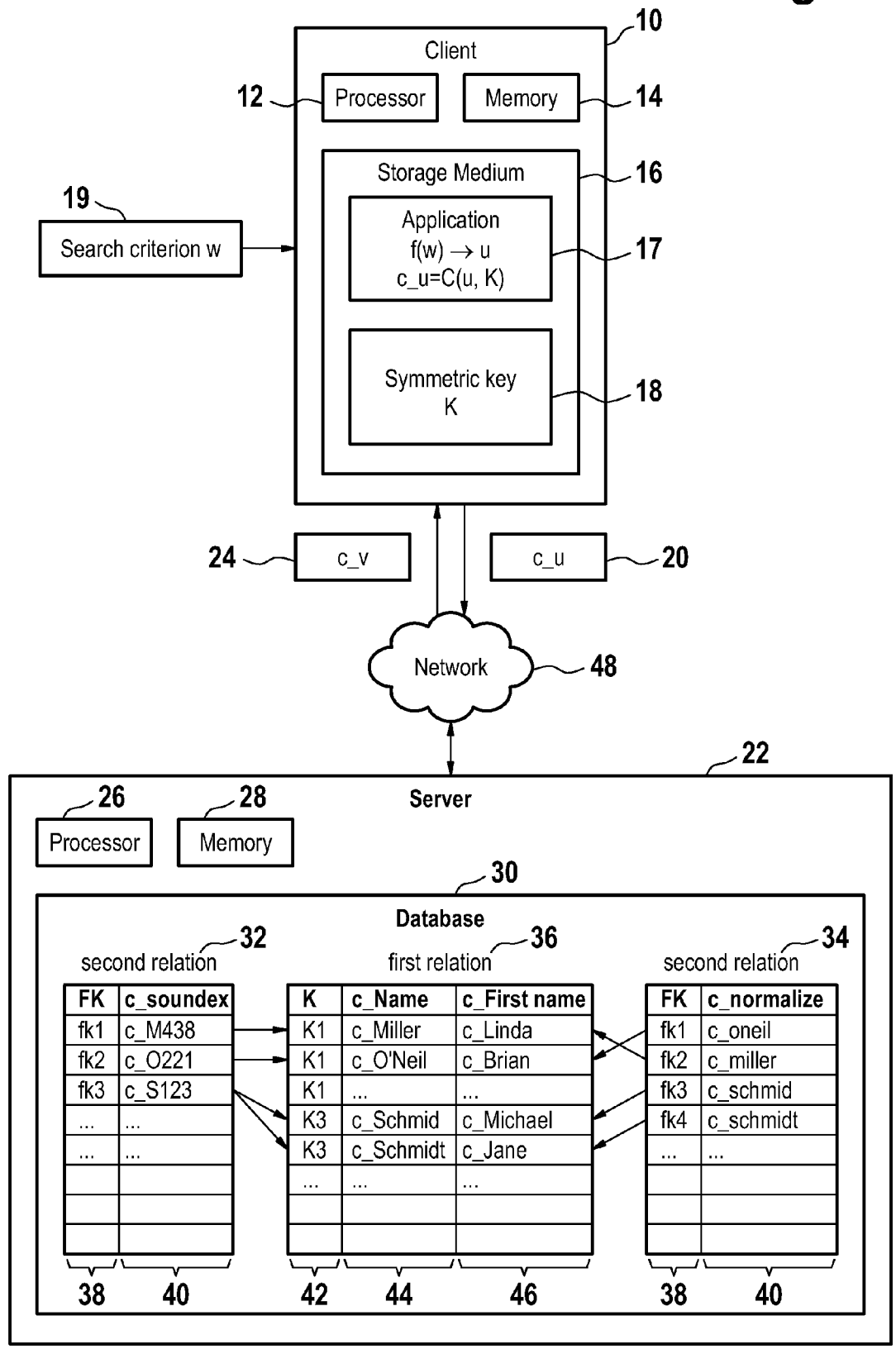

| | | | |
|---|---|---|---|
| 2004/0258281 A1* | 12/2004 | Delgrosso | G06K 9/00973 382/115 |
| 2005/0147240 A1* | 7/2005 | Agrawal | G06F 21/60 380/28 |
| 2005/0147246 A1* | 7/2005 | Agrawal | H04L 9/0662 380/44 |
| 2008/0080718 A1 | 4/2008 | Meijer et al. | |
| 2009/0300351 A1 | 12/2009 | Lei et al. | |
| 2011/0145593 A1* | 6/2011 | Auradkar | G06F 21/6218 713/189 |
| 2013/0191650 A1* | 7/2013 | Balakrishnan | G06F 21/6227 713/190 |
| 2014/0136840 A1* | 5/2014 | Spalka | G06F 21/6218 713/165 |

OTHER PUBLICATIONS

Song, D. et al., "Practical Techniques for Searches on Encrypted Data", in Proc. of the 2000 IEEE Symposium on Security and Privacy (S&P 2000), 2000, 12 pages.

\* cited by examiner

COMPUTER SYSTEM FOR STORING AND RETRIEVAL OF ENCRYPTED DATA ITEMS, CLIENT COMPUTER, COMPUTER PROGRAM PRODUCT AND COMPUTER-IMPLEMENTED METHOD

The present invention relates to a computer system for storing and retrieval of encrypted data items, such as for storing encrypted data items in the cloud, as well as a respective client computer, client computer system, computer program product and computer-implemented method.

Storage and retrieval of encrypted data items for which confidentiality needs to be preserved on a server computer is as such known from the prior art, such as from D. Song, D. Wagner and A. Perrig, "Practical Techniques for Searches on Encrypted Data", in Proc. of the 2000 IEEE Symposium on Security and Privacy (S&P 2000), 2000. And (IJCSIS) International Journal of Computer Science and Information Security, Vol. 9, No. 8, August 2011, Efficient Cryptographic Technique for Securing and Accessing Outsourced Data, Hasan Omar Al-Sakran, Fahad Bin, Muhayalrina Serguievskaia, Management Information Systems Department King Saud University Riyadh, Saudi Arabia.

It is an object of the present invention to provide an improved computer system for storing and retrieval of encrypted data items as well as a respective client computer, computer program product and computer-implemented method.

The underlying problem of the invention is solved by the features laid down in the independent claims. Embodiments of the invention are given in the dependent claims.

Embodiments of the invention provide for a computer system comprising a client computer and a database stored on a server, the server being coupled to the client computer via a network, wherein the database comprises a first relation and a second relation, wherein the first relation comprises first data items, wherein the first data items are encrypted with a first cryptographic key in the first relation, wherein the second relation comprises equivalence classes, wherein the equivalence classes are encrypted with a second cryptographic key in the second relation, wherein each equivalence class is a functional value of one of the first data items, the functional value being obtainable by applying an equivalence relation to the one of the first data items, wherein the second relation comprises for each equivalence class a referential connection assigning the equivalence class to the first data item stored encrypted in the first relation whose equivalence class is the functional value of said first data item, wherein the client computer has installed thereon an application program, the application program being operational to perform the steps of:
  receiving a search criterion,
  applying the equivalence relation to the search criterion for obtaining a search equivalence class,
  encrypting the search equivalence class with the second cryptographic key,
  generating a database query using the encrypted search equivalence class,
  entering the database query into the database stored on the server,
  in response to the query, receiving an encrypted first data item matching the equivalence relation of the search criterion,
  decrypting the received encrypted first data item using the first cryptographic key,
wherein the database is operational to perform the steps of:
  receiving the database query,
  applying the query to the second relation for obtaining a matching equivalence class,
  determining in the first relation the encrypted first data item assigned to the matching equivalence class using the referential connection of the matching equivalence class,
  providing the determined encrypted first data item to the client computer.

Embodiments of the invention may have the advantage that a search for first data items stored in the database is possible, even though the first data items are stored encrypted in the database and the search is not performed directly for the first data items themselves but on functional values of said first data items. The retrieval of the first data items from the database can be performed without any knowledge of the respective cryptographic key by the database. At no time, the database has to be aware of the first cryptographic key or the plain text content of the first data items. Thus, there is no risk of compromising the first data items at the database. Nevertheless, standard database techniques can be used for querying the database including usage of indexes. Therefore, the search and retrieval of first data items is quick. Further, the amount of data to be transmitted between the client computer and the database is limited to a minimum. For example, only standard queries and retrieved first data items need to be transmitted between the client computer and the database. This may predestine the employment of the described computer system in a cloud computing environment with the database being part of the cloud.

Further, any communication between the client computer and the database is secure since it is encrypted by the cryptographic key. It has to be noted that in the context of relational databases, a referential connection is a referential constraint between two tables. For example, a referential connection is a field in a relational table that matches a candidate key of another table. The referential connection can be used to cross-reference the tables. However, the disclosure is not limited to relational databases.

In accordance with an embodiment of the invention, the first cryptographic key is a symmetric or an asymmetric key and/or the second cryptographic key is a symmetric or an asymmetric key.

In accordance with an embodiment of the invention the data items are tuples or attribute values of an attribute. The above-described procedure can thus be applied either for tuples as a whole, or parts of tuples or to individual attribute values. For example, the equivalence relation may be adapted in such a manner that a whole tuple or a part of the tuple is considered. Thus, the search criterion may only cover a limited aspect of what it may be comprised in the tuple. It has to be noted here, that the description is not limited to single values of an attribute. An attribute may also comprise multiple elements like for example multiple numbers separated from each other by for example, commas, semicolons or even multiple Boolean operators.

Generally, a data item as understood herein is any data value of a data element of a tuple that comprises one or more data elements, such as a data value of a data field of a data record that has multiple data fields, within a database, such as a relational data-base, object oriented databases, object relational databases, hierarchical data-bases, noSQL data-bases, or in-memory database. For example, a medical data record of a patient may comprise various data elements, e.g. data fields, such as name, address, telephone number and medical data fields of that patient where data values for name, address and telephone number are exemplary data items.

In accordance with an embodiment of the invention, the equivalence relation comprises a Soundex algorithm or a variant of a Soundex algorithm. This may have the advantage that the search criterion may be evaluated with respect to its sounding when spoken by a human being thus enhancing the probability of finding respective hits in the database, namely the first relation.

In accordance with an embodiment of the invention, the equivalence relation comprises a text normalization function. Herein a text normalization function is understood as any function which is adapted for transforming text including numbers and dates into a single canonical form. For example, this comprises lemmatization and/or stemming of the text.

This may have the advantage that for example irrespective of the lexicographic writing of the search criterion, the client is able to retrieve correctly the searched first data item. The text normalization function may for example be adapted to normalize all letters in a word to only small letters or only capital letters. Further, a more high sophisticated normalization function may automatically correct common spelling errors or typos such that the probability of finding a searched first data item is drastically enhanced.

In accordance with an embodiment of the invention, the equivalence relation comprises a truncation function for truncating a predefined portion of each of the first data items. For example, in case the first data items comprise attributes of a first name and a last name, the truncation function may omit the first name for updating of the second relation. Also, when receiving the search criterion, the equivalence relation may omit the first name (if provided) and only consider the last name. In another example, in case the first data items are dates comprising a day, month and year, the truncation function may omit the day and the year and only provide equivalent classes which consider the month. In this case, when applying the equivalence relation to the search criterion for obtaining the search equivalence class, the equivalence relation may omit any day and year (if given) in the search criterion and only consider the month as the search equivalence class.

In accordance with an embodiment of the invention, the database further comprises an index of the second relation, wherein the database is operational to apply the query to the second relation using the index of a second relation. As already mentioned above, standard database organization techniques can be used irrespective of the fact that any data comprised in the database is encrypted. Thus, a standard database like a relational database can be used without any further modification. This also permits to simply run an index over the encrypted equivalence classes in the second relation, or in general over the second relation, in order to drastically speed up the retrieval of the first data items from the database.

In accordance with another embodiment of the invention, the database is a relational database.

In accordance with an embodiment of the invention, the client computer is a client computer of a multiple sets of client computers, each client computer having installed thereon the application program, the application program comprising client computer specific log-in information, wherein the system further comprises:

a database system, the database system comprising the database, the database system having a log-in component for logging-in the client computers, the database system being partitioned into multiple relational databases, each one of the databases being assigned to one set of the sets of client computers, each database storing encrypted data items, wherein the first data items are comprised in said data items, each data item being encrypted with a user or user-group specific cryptographic key, wherein the first cryptographic key corresponds to said user or user-group specific cryptographic key. the key identifier of the cryptographic key with which one of the data items is encrypted being stored in the database as an attribute of the one of the encrypted data items, the log-in component comprising assignment information indicative of the assignment of the databases to the set of client computers, each one of the application programs being operational to perform the steps of:
a) establishing a network session with the database system over the network,
b) transmitting the client computer specific log-in information to the database system via the session,
c) receiving the key and the key identifier by the client computer for use of the key by the client computer and without transmitting the key to the database system;
d) entry of a search criterion into the client computer,
e) generating a database query using the search criterion and the key identifier, the key identifier limiting the query to encrypted data items that have an attribute matching the key identifier,
f) in response to the query, receiving at least one encrypted data item matching the search criterion from the database system,
g) decrypting the encrypted data item using the cryptographic key, the database system being operational to perform the steps of:
i) receiving the client computer specific log-in information via the session by the log-in component of the database system,
ii) determining one of the databases of the database system that is assigned to the client computer on which the application program is installed using the assignment information, by the log-in component of the database system,
iii) entering the query received from the application program via the session into the database that has been determined using the log-in information for processing the query by that database.

Thus, embodiments of the invention may further provide for a computer system that has multiple sets of client computers. Each set of client computers may belong to a separate organizational entity, such as a separate health service provider, and be located in a separate access restricted environment, such as a medical practice or hospital. Access restriction to the environment can be implemented by physical, such as edificial, and/or organizational measures and/or by an electronic access control system. For example, the entrance door of a medical practice has an electronic lock that can be unlocked by presenting a security token of an authorized user that belongs to the medical practice, such as one of the health professionals or an assistant. During the opening hours of the medical practice access control can be performed by the receptionist of the medical practice.

It is important to note that the access restricted environment in which a set of client computers is located is a trusted environment in which confidentiality of data items, such as patients' medical records, is preserved.

In accordance with embodiments of the invention some or all of the client computers are located outside an access protected enclosed trusted environment. For example, at least some of the client computers are portable electronic telecommunication devices, such as mobile radios or digital cellular mobile telephones, such as smartphones or tablet computers that have a telecommunication interface, such as a GSM, UMTS, WLAN or other network interface.

This is particularly beneficial for applications that involve terrestrial users in vehicles or on foot, such as for emergency responder organizations or public works organizations. In the field of the provision of healthcare services this is particularly beneficial as it enables the use of a mobile portable battery powered client device in the context of emergency medical services and/or home visits of patients by medical doctors.

The cryptographic key and key identifier that is stored in one of the security tokens is specific to the authorized user such that a data item that is inserted into the database upon a respective entry of the data item by that user is encrypted with that user's cryptographic key and can only be retrieved and decrypted by the same user as the user needs to present the security token for the retrieval and decryption operation. Alternatively the user has to memorize the cryptographic key and its key identifier for entry into the respective client computer. As a further alternative the user has to memorize a credential, such as a username/password combination, for entry into the client computer. When the client computer receives the credential from the user it derives the cryptographic key assigned to the user and the respective key identifier using a predefined deterministic algorithm. For example, a predefined function can be utilized for deriving a symmetric key from the user credential. For deriving an asymmetric key pair a method disclosed in U.S. Pat. No. 8,266,435 B2 which is incorporated herein in its entirety can be utilized whereby the credential from which the asymmetric key pair is derived comprises a unique user ID and an arbitrarily selectable user ID.

A "cryptographic key" as understood herein encompasses a symmetric key that serves both for encryption and decryption as well as an asymmetric cryptographic key pair, where the public key is used for encryption and the private key is used for decryption.

A "key identifier" as understood herein encompasses an identifier of a symmetric key or an identifier that identifies an asymmetric cryptographic key pair.

Alternatively the cryptographic keys and key identifiers stored on the security tokens are not user but user-group specific. For example all authorized users of the same set of client computers, i.e. users belonging to the same organizational entity, share a common cryptographic key and key identifier that is specific to that user-group. As a further alternative user-groups within a given organizational entity that share the same set of client computers can be defined for database access rights management such that the users of such defined groups within the organizational entity share a common cryptographic key and key identifier.

In accordance with an embodiment of the invention the cryptographic key and its key identifier of a given user enables the user to access further cryptographic keys and their respective key identifiers. This is accomplished by storing such additional cryptographic keys in encrypted form on the database system together with the respective key identifiers.

Upon entry of the user's cryptographic key and key identifier into the client computer the key identifier is sent from the client computer to the database system. In response to receipt of the key identifier the database system returns the set of encrypted cryptographic keys that are assigned to the received key identifier such that the client computer can decrypt that additional set of cryptographic keys using the key that the user has entered. When a query is performed one or more of the additional key identifiers can be used as alternative or additional search criteria in order to include data items into the search that can be decrypted by one of the cryptographic keys that are available on the client computer.

In accordance with embodiments of the invention the application program is operational for generating an electronic signature for the encrypted data item and/or the key identifier. The database system is operational for checking the validity of the electronic signature and for executing the database insert command only if the electronic signature is valid. This provides an additional level of security against sabotage.

In accordance with alternative embodiment of the invention the application program is operational for generating an electronic signature for the unencrypted data item and/or the key identifier. The database system is not operational for checking the validity of the electronic signature, as it has no access to the unencrypted data item, and executes the database insert command without checking the validity of the electronic signature. The checking of the validity of the electronic signature is performed by the application program after retrieval and decryption of the data item. This also provides an additional level of security against sabotage.

In accordance with embodiments of the invention each set of client computers belongs to or constitutes a trusted entity and each set of client computers has its own dedicated set of users that are authorized with respect to that set of client computers. It is important to note that each entity as such is trusted and maintains the confidentiality of its own data items but that such trust does not exist between the various entities such that each one of the entities is prevented access to data items of another one of the entities.

In accordance with embodiments of the invention the database system is coupled to all sets of client computers via a network, such as a public network, in particular the Internet. The database system has a log-in component for logging-in the client computers.

A 'log-in component' of the database system is understood herein as encompassing any component of the database system for receiving authentication information, such as a username and password combination, and for establishing a database connection upon successful authentication. For example, upon receipt of a log-in command by the database system, the database system requests entry of the authentication information and establishes the database connection if the authentication information is correct.

It is important to note that the authentication information, i.e. the log-in information, is not user-specific in accordance with the present invention but it is client computer specific as the log-in information forms an integral part of the application program that is installed on any one of the client computers.

Providing the application programs with client computer specific log-in information rather than log-in information that is specific to the trusted environment has the advantage that removal or loss of one of the client computers from the trusted environment does not require to replace the log-in information in all of the remaining client computers within that trusted environment. Further, another advantage is that the assignment information used by the log-in component of the database system does only need to be updated by deleting the log-in information of the removed or lost client computer without a need to change the assignment information otherwise.

After a session via the network has been established between the application program and the database system, such as an internet session, the application program sends a log-in command to the database system in response to which the database system prompts the application program for sending the log-in information. In response, the application program reads the log-in information and sends the log-in information to the database system for checking and for establishing the database connection with one of the databases. It is important to note that such a log-in operation can be executed without the user's interaction as the user does not need to enter log-in information as the log-in information is client computer specific and forms an integral part of the application program. Hence a standard log-in function provided by the database system, such as a MySQL log-in function, is used not for logging in a user but for logging in the client computer on which the application program that comprises the log-in information is installed.

In accordance with embodiments of the invention the database system is partitioned into multiple databases where each one of the databases is assigned to one set of the sets of client computers. In other words, the database system comprises multiple databases and there is a one-to-one relationship between sets of client computers and databases. This serves as a protection of a database that is assigned to one of the sets of client computers from attacks, such as denial of service attacks, from one of the other sets of client computers and it limits the risk against sabotage, the infiltration of computer viruses and other malicious software to the individual databases while limiting the risk of spreading from one database to another.

The assignment of sets of client computers to databases is implemented by assignment information that is indicative of these assignments and which is accessible by the log-in component. The log-in component uses the authentication information, i.e. the log-in information, that it receives from a client computer for retrieval of the assignment of that client computer and thus the set to which it belongs to one of the databases. A database connection is then established between the application program of that client computer and the assigned database provided the log-in is successfully completed.

Each one of the databases stores encrypted data items whereby the encryption is performed with one of the user or user-group specific cryptographic keys of the security tokens. Each one of the encrypted data items is stored in conjunction with the key identifier, but not the key itself, that was used for encryption of the data item as an attribute. This facilitates to limit the search in the database for retrieval of an encrypted data item to such data items that have been encrypted by a given cryptographic key.

In accordance with embodiments of the invention a database query is generated by encrypting a search criterion with the entered key by the application program. The search can thus be executed by the respective database in the encrypted domain. In addition to the search criterion that is entered by the user the query is limited by the key identifier of the entered key, such that the database system only returns encrypted data items that not only match the encrypted search criterion but also the key identifier. This way the set of database hits that are returned in response to the query is limited to encrypted data items that have been encrypted with the key that is identified by the key identifier. This reduces the network load and avoids unnecessary data processing operations by the client computer, such as for attempting to decrypt and/or verify a encrypted data item that can in fact not be decrypted by the client computer.

In accordance with embodiments of the invention the client computers also have log-in components for providing an additional level of security. The client log-in components serve for logging in a user by means of user specific authorization information, such as a username/password combination and/or biometric user information. After user log-in into one of the client computers the user may start the application program that is installed on that client computer whereupon the user is prompted to present his or her security token.

The application program may then send an access command, such as a chip card command in the form of an APDU, to the security token for reading the cryptographic key and the key identifier stored on that security token of the user. the user must first authenticate against the security token in order to enable such a read access by the application program. This way it is ensured that the security token that is presented by the user is in fact the security token of that user.

After performance of the client computer specific log-in into the database system and the establishment of the database connection the user may perform multiple queries or insert data items while the cryptographic key and key identifier are stored in the working memory of the client computer. The cryptographic key and key identifier are automatically erased from the memory of the client computer and no copy is retained by the client computer when one of the following events occurs a time-out condition is fulfilled, e.g. a predefined time period of user inaction with respect to the application program has occurred, the database connection and/or the network session is interrupted, the application program is closed by the user or automatically by logging out the user, the power supply of the client computer is interrupted.

This can be implemented e.g. by the log-in component of the client computer or by the application program. This has the advantage that the user needs to present his or her security token only once after each log-in for ease of use of the system while a high level of security is maintained due to the fact that the cryptographic key that has been read in from the security token is automatically erased when the user is logged out.

In accordance with embodiments of the invention each client computer has a client log-in component for logging-in a user into the respective client computer upon receiving authentication information from that user, such as a username/password combination and/or biometric information, wherein the cryptographic key and the key identifier is entered into the client computer after logging-in that user and stored in the client computer until the user is logged-out. For example, the user is prompted to enter his or her cryptographic key and key identifier by the application program that is started after the user has logging-in into the client computer.

In accordance with embodiments of the application the client computer specific log-in information of a client computer is stored in a configuration file of the application program that is installed on that client computer, such as an INI file, a registry or an XML.config file of the application program.

In accordance with embodiments of the invention each security token has a secure memory area in which a private key of an asymmetric cryptographic key pair assigned to that security token and its user is stored. Further, the security token has a processor for generating an electronic signature using that private key. Such an electronic signature is also referred to as a digital signature. For insertion of a data item into the respective database a signature of that data item is generated by the security token and stored in the database together with the encrypted data item. When the encrypted data item is retrieved at a later point of time by the same user or a user that belongs to the same user-group the validity of that signature can be checked by the application program after decryption of the data item.

Embodiments of the invention may be particularly advantageous as they may enable the efficient and secure storage of confidential data, such as medical records, in the cloud. The term 'cloud' as understood herein encompasses any database system that is accessible via a network, such as the Internet, and that is outside the control and responsibility of the organizational entities, such as health service providers, that utilize that database system. Embodiments of the invention are particularly advantageous as the storage of confidential data, such as medical records, in the cloud, i.e. a third party storage system or network, is enabled while fulfilling all regulatory requirements as to the maintenance of confidentiality. In particular, the third party that operates the database system does not need to be a trusted entity in terms of maintenance of confidentiality, authenticity and integrity of the data.

In another aspect, the invention relates to a client computer for updating a database stored on the server via a network, wherein the database comprises a first relation and a second relation, wherein the client computer has installed thereon an application program, the application program being operational to perform the steps of:
    receiving a first data item,
    applying an equivalence relation to the first data item for obtaining a functional value, the functional value describing an equivalence class of the first data item,
    encrypting the equivalence class using a second cryptographic key,
    encrypting the first data item using a first cryptographic key,
    sending the encrypted first data item to the database for storage with a first relation,
    sending the encrypted equivalence class to the database for storage with a second relation,
    instructing the database to add a referential connection to the stored encrypted equivalence class, the referential connection assigning the encrypted equivalence class to the stored encrypted first data item.

In accordance with another embodiment of the invention, the application program is comprising client computer specific log-in information, wherein the client computer further comprises:
    a communication interface for receiving a user or user-group specific key and a key identifier of that cryptographic key, wherein the first cryptographic key is corresponding to such a user or user-group specific key, the communication interface being operational for manual entry of user information specifying the user or user-group specific key and a key identifier and/or for communication with one security token (STik) of a set of security tokens, the security token being assigned to one authorized user, a user or user-group specific key and a key identifier of that cryptographic key being stored on the security token,
    a network communication interface for communication with a database system comprising the database,
    the application program being operational to perform the following steps for writing the first data item to the database system:
    entry of the first data item into the client computer,
    encrypting the first data item with the key that has been entered into the client computer,
    generating a database insert command, the insert command comprising the encrypted first data item and the key identifier of the key with which the first data item has been encrypted as an attribute of the encrypted data item for storing the encrypted first data item in the database system with the key identifier as an attribute,
    establishing a session with the database system over the network by the network communication interface,
    transmitting the insert command via the session to the database system for processing by the one of the databases that has been determined to be assigned to the client computer by the log-in component such that the encrypted first data item with the key identifier is stored in that database,
    the application program being operational to perform the following steps for reading the first data item:
    establishing a session with the database system over the network,
    transmitting the client computer specific log-in information to the database system via the session,
    entry of the key and the key identifier from one of the security tokens into the client computer for use of the key by the client computer and without transmitting the key to the database system;
    entry of a search criterion into the client computer,
    generating a database query using the search criterion and the key identifier, the key identifier limiting the query to encrypted data items that have an attribute matching the key identifier,
    in response to the query, receiving an encrypted first data item matching the search criterion from the database system,
    decrypting the encrypted data item using the cryptographic key.

In accordance with embodiments of the invention the cryptographic key or the cryptographic keys that are stored on a client computer for encryption and/or decryption of data items are automatically erased from the memory of that client computer if the user closes the application program running on that client computer, the user is logged off by the operating system of the client computer, such as when a timeout condition is fulfilled due to an extended phase of user inaction, and/or when the power supply is switched off or becomes unavailable, such as when the client computer is switched off or the storage capacity of the battery that powers the client computer is exhausted. Preferably, the at least one cryptographic key for the encryption and/or decryption of the data items is stored in volatile memory of the client computer such that it is ensured that the at least one key is erased when the power supply is switched off or becomes unavailable, such as when the client computer is a mobile battery powered device and its batteries become exhausted.

Automatically erasing the at least one key from the memory of the client computer is particularly beneficial if the client computer is utilized outside the trusted environment, such as for terrestrial use in vehicles or on foot. In such a situation it may occur that a user leaves his or her client computer unattended. Automatically erasing the at least one key from the client computer such as when a timeout condition is fulfilled provides an additional level of security. Even if an unauthorized party gets into the possession of the client computer which has been lost by an authorized user or that was stolen the unauthorized party cannot access or decrypt the encrypted data items that are stored on the database system if the key has been erased from the memory of that client computer before the unauthorized party gets into the possession.

In accordance with further embodiments of the invention the at least one key is erased from the memory of the client device in response to a respective command received from the user in order to enable another authorized user to utilize that client device while preventing access of to the data items of the previous user. This has the additional advantage of making a user log-in of the operating system, such as a Windows log-in, superfluous or unnecessary, as entering the cryptographic key that is assigned to one of the users for encryption and/or decryption of data items de facto also serves as a log-in credential for utilizing a given one of the client computers.

Embodiments of the invention are particularly advantageous as confidentiality, authenticity and integrity of the data items that are stored by the database system are maintained even though the database system may be under the control of an un-trusted third party. In addition, embodiments of the invention also provide protection against inter-customer vandalism by partitioning the database system into separate databases which are assigned to individual customers, i.e. organizational entities, such as health service providers.

Furthermore, embodiments of the present invention provide protection against unintentional erroneous data storage operations as well as against intentional sabotage, such as erasing data from one of the databases. This is accomplished by a database log that tracks database changes such that an earlier status of a database can be reconstructed from the database log.

In another aspect, the invention relates to a method of querying by a client computer a database stored on the server, the server being coupled to the client computer via a network, wherein the database comprises a first relation and a second relation, wherein the first relation comprises first data items, wherein the first data items are encrypted with a first cryptographic key in the first relation, wherein the second relation comprises equivalence classes, wherein the equivalence classes are encrypted with a second cryptographic key in the second relation, wherein each equivalence class is a functional value of one of the first data items, the functional value being obtainable by applying an equivalence relation to the one of the first data items, wherein the second relation comprises for each equivalence class a referential connection assigning the equivalence class to the first data item stored encrypted in the first relation whose equivalence class is the functional value of said item, the method comprising at the client computer:
   receiving a search criterion,
   applying the equivalence relation to the search criterion for obtaining a search equivalence class,
   encrypting the search equivalence class with the second cryptographic key,
   generating a database query using the encrypted search equivalence class,
   entering the database query into the database stored on the server,
   in response to the query, receiving an encrypted first data item matching the equivalence relation of the search criterion,
   decrypting the received encrypted first data item using the first cryptographic key,
The method further comprising at the server:
   receiving the database query,
   applying the query to the second relation for obtaining a matching equivalence class,
   determining in the first relation the encrypted first data item assigned to the matching equivalence class using the referential connection of the matching equivalence class,
   providing the determined encrypted first data item to the client computer.

In another aspect, the invention relates to a method of updating a database stored on the server, wherein the database comprises a first relation and a second relation, wherein the method comprises at a client computer:
   receiving a first data item,
   applying an equivalence relation to the first data item for obtaining a functional value, the functional value describing an equivalence class of the first data item,
   encrypting the equivalence class using a second cryptographic key,
   encrypting the first data item using a first cryptographic key,
   sending the encrypted first data item to the database for storage with a first relation,
   sending the encrypted equivalence class to the database for storage with a second relation,
   instructing the database to add a referential connection to the stored encrypted equivalence class, the referential connection assigning the encrypted equivalence class to the stored encrypted first data item.

This may have the advantage that first data items can be stored on the server for later retrieval via equivalence relations without requiring any knowledge by the server on the content of the first data items. Thus, the server may even be located in an unsafe environment with the risk of database intruders. However, at no time point an administrator or database intruder will have access to the content of the first data items, since the first data items are always encrypted. The same holds with respect to the equivalence classes. Only the client is aware of the content of the first data items, as well as the equivalence classes. Further, it is the client that is instructing the database how to store the first data items and equivalence classes with respect to their association via the referential connection.

In accordance with an embodiment of the invention, the method further comprises at the database determining if the received encrypted equivalence class is already stored with the second relation, wherein
   in case the received encrypted equivalence class is already stored with the second relation, the already stored encrypted equivalence class is updated by adding the referential connection to the stored equivalence class,
   in case the second relation is devoid of the received encrypted equivalence class, the method comprises storing the equivalence class in the second relation and adding the referential connection to the stored encrypted equivalence class.

In another aspect, the invention relates to a computer program product comprising computer executable instructions to perform the method steps as described above.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Within the context of the present invention, a database index is a data structure that improves the speed of data retrieval operations. Indices may be created using one or more columns of a database table, providing the basis for both rapid random lookups and efficient access of data items.

Further, within the context of the present invention, the term 'Soundex' refers to a general class of phonetic algorithms for indexing names by sound. The goal is for homophones to be encoded to the same equivalence class so that they can be matched despite minor differences in spelling.

Figure 4:
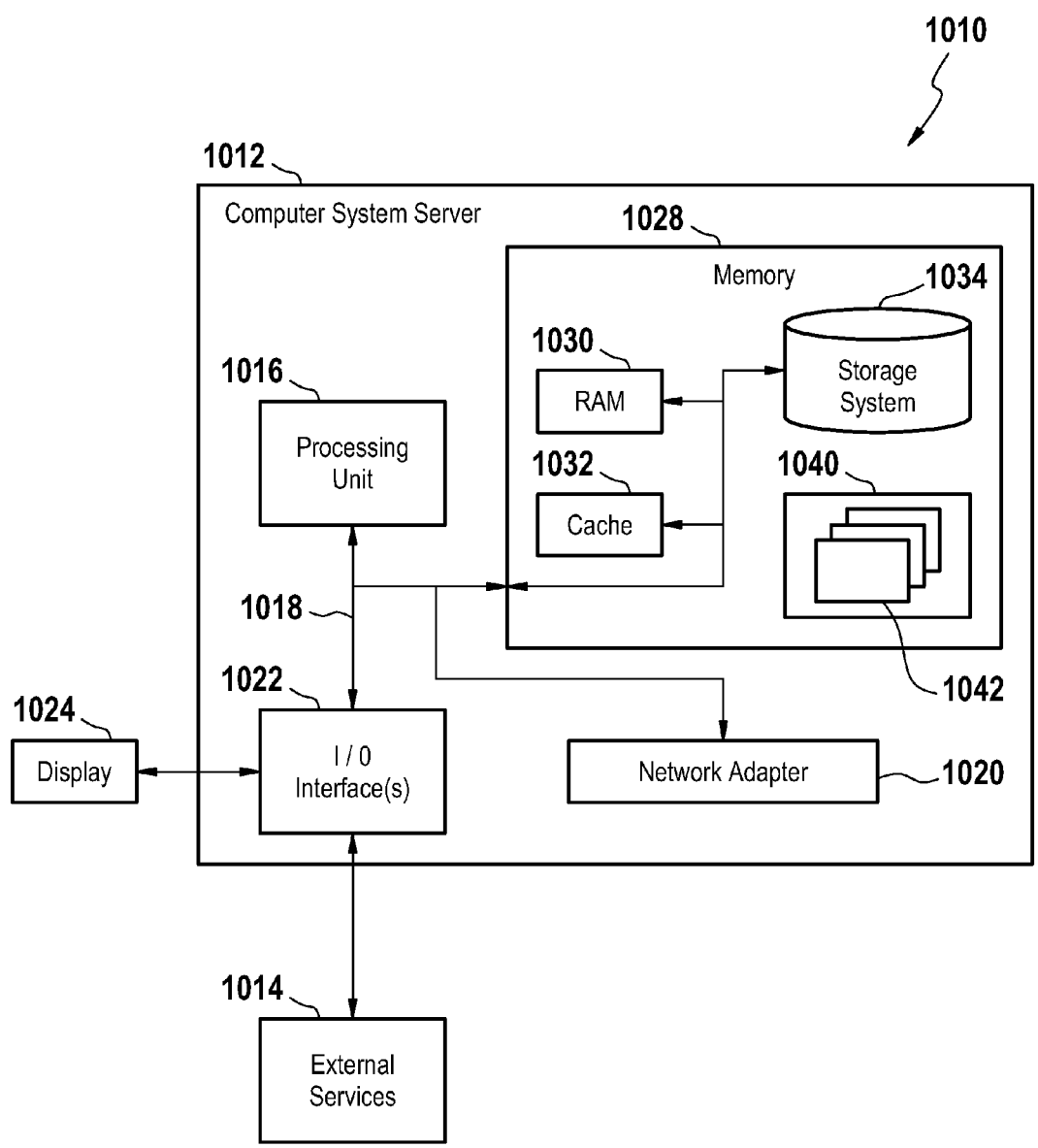
Figure 5:
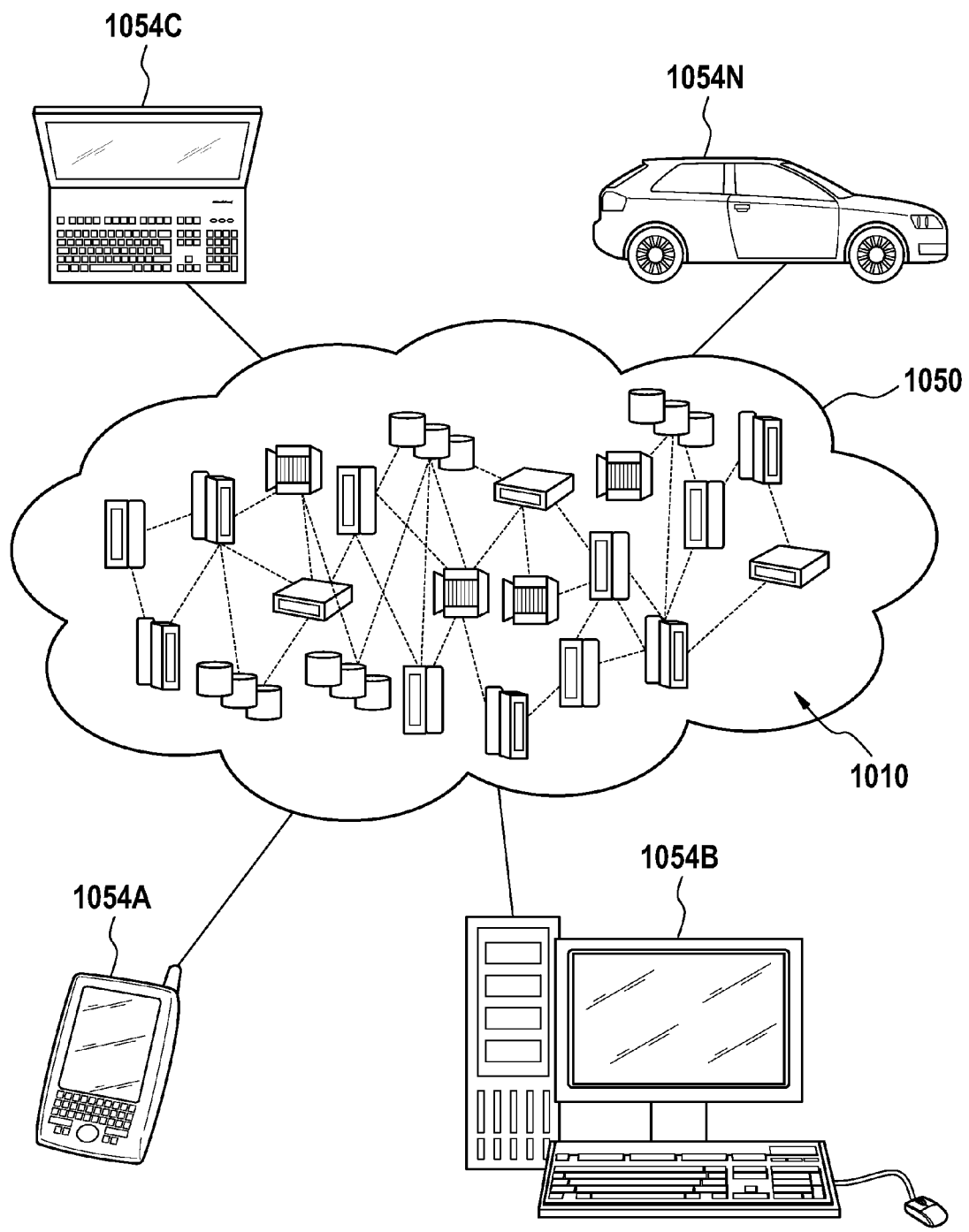

It is understood in advance that although this disclosure includes a detailed description on cloud computing in FIGS. 4 and 5, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
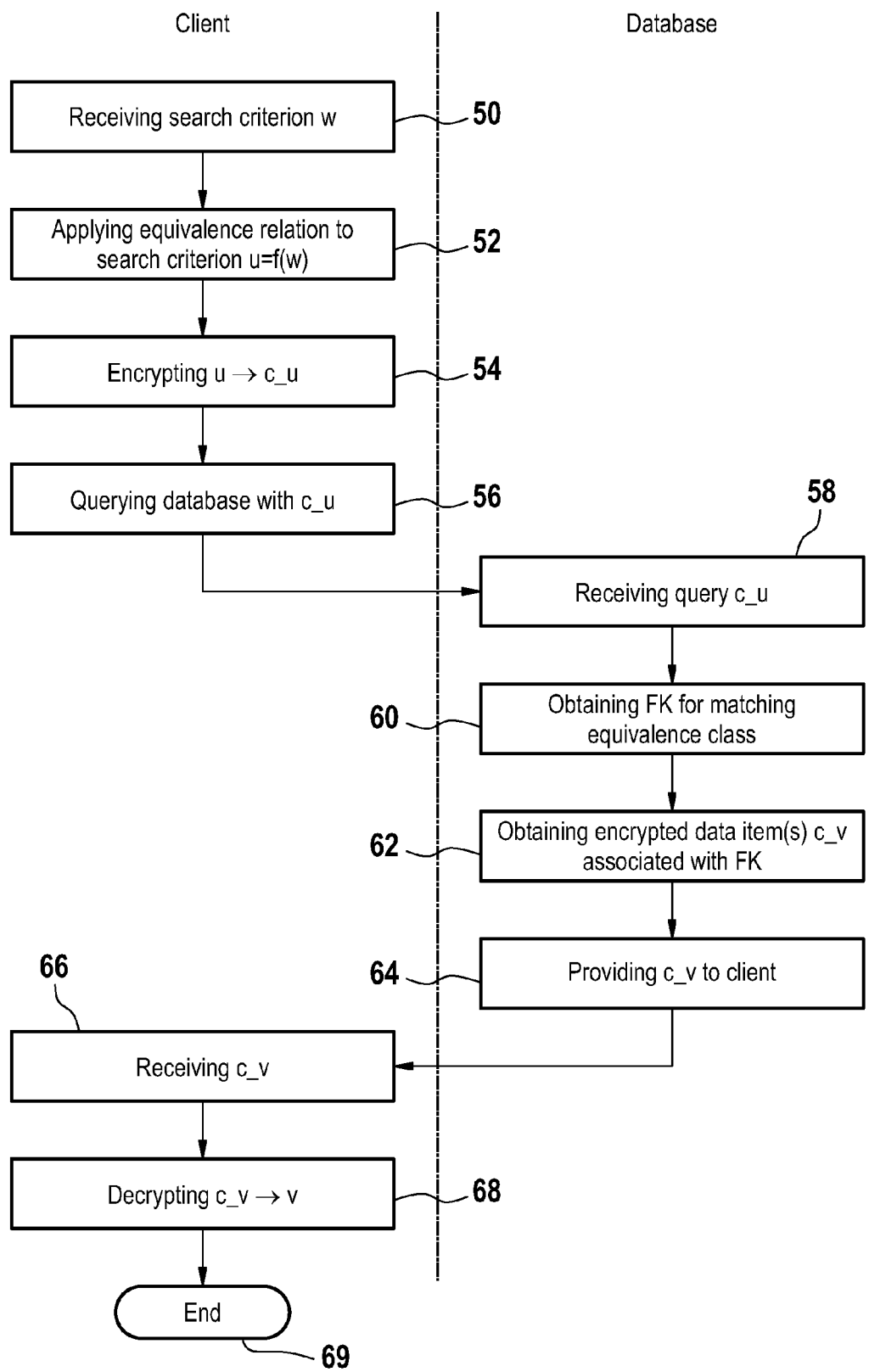
Figure 3:
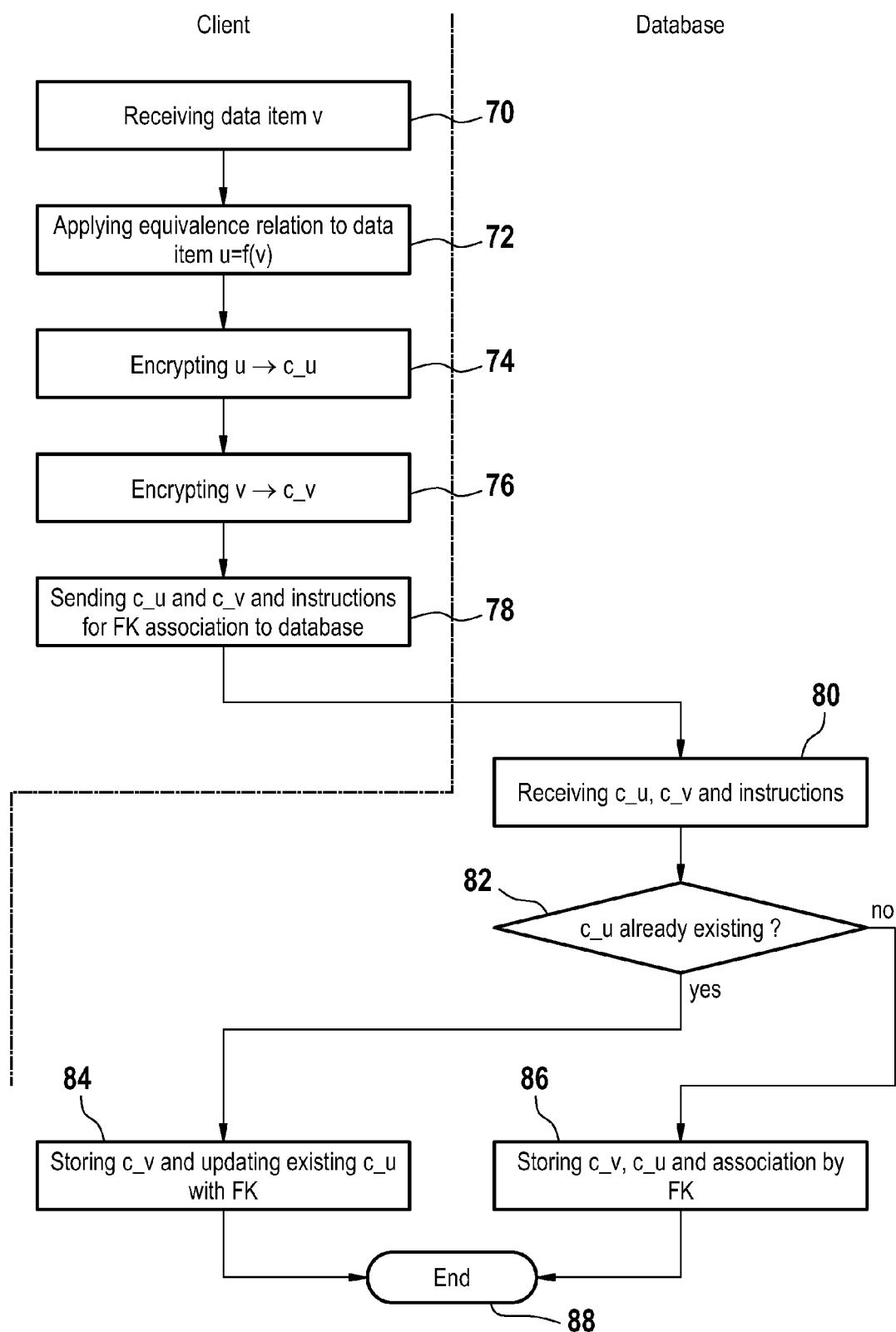
Figure 6:
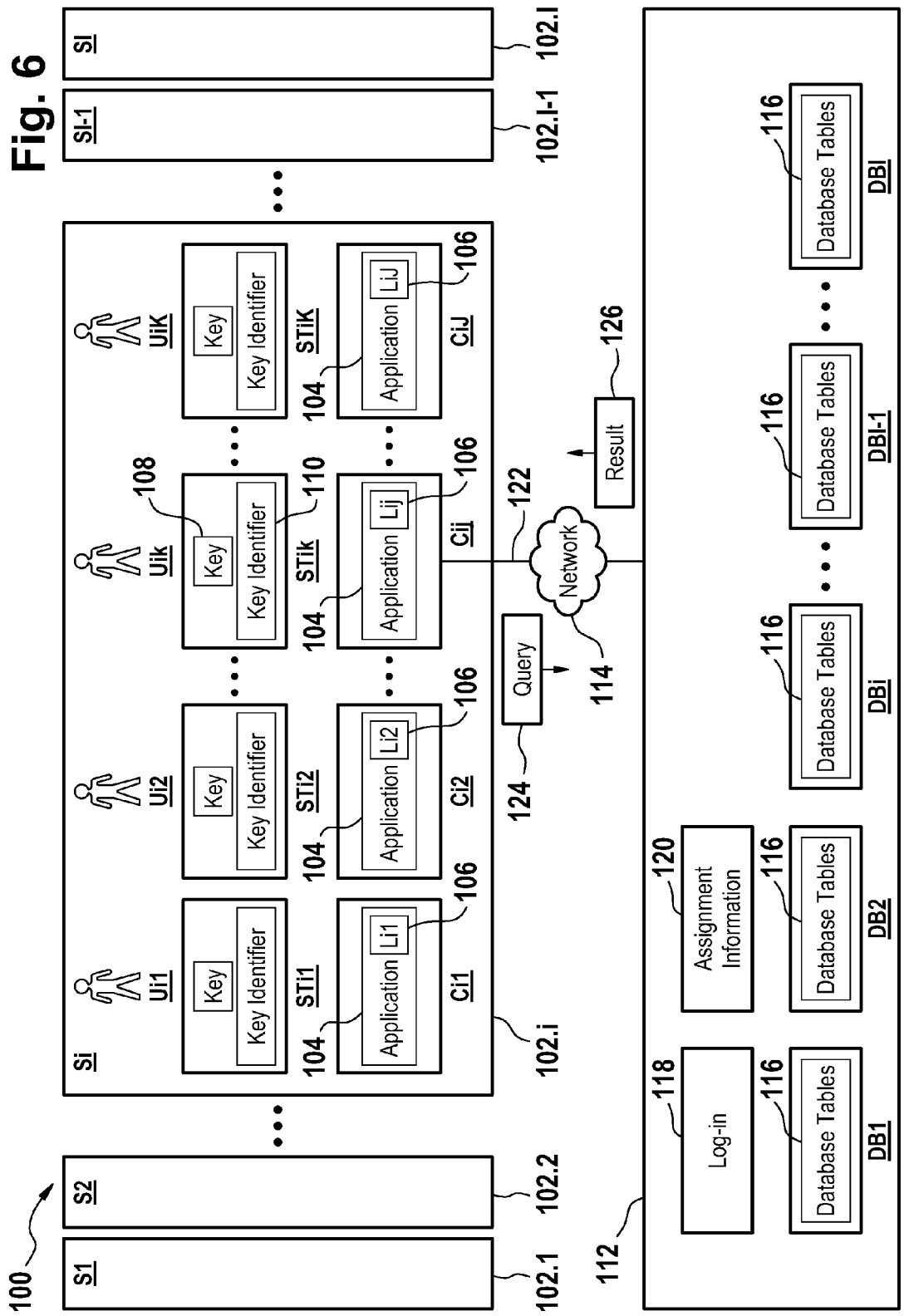
Figure 7:
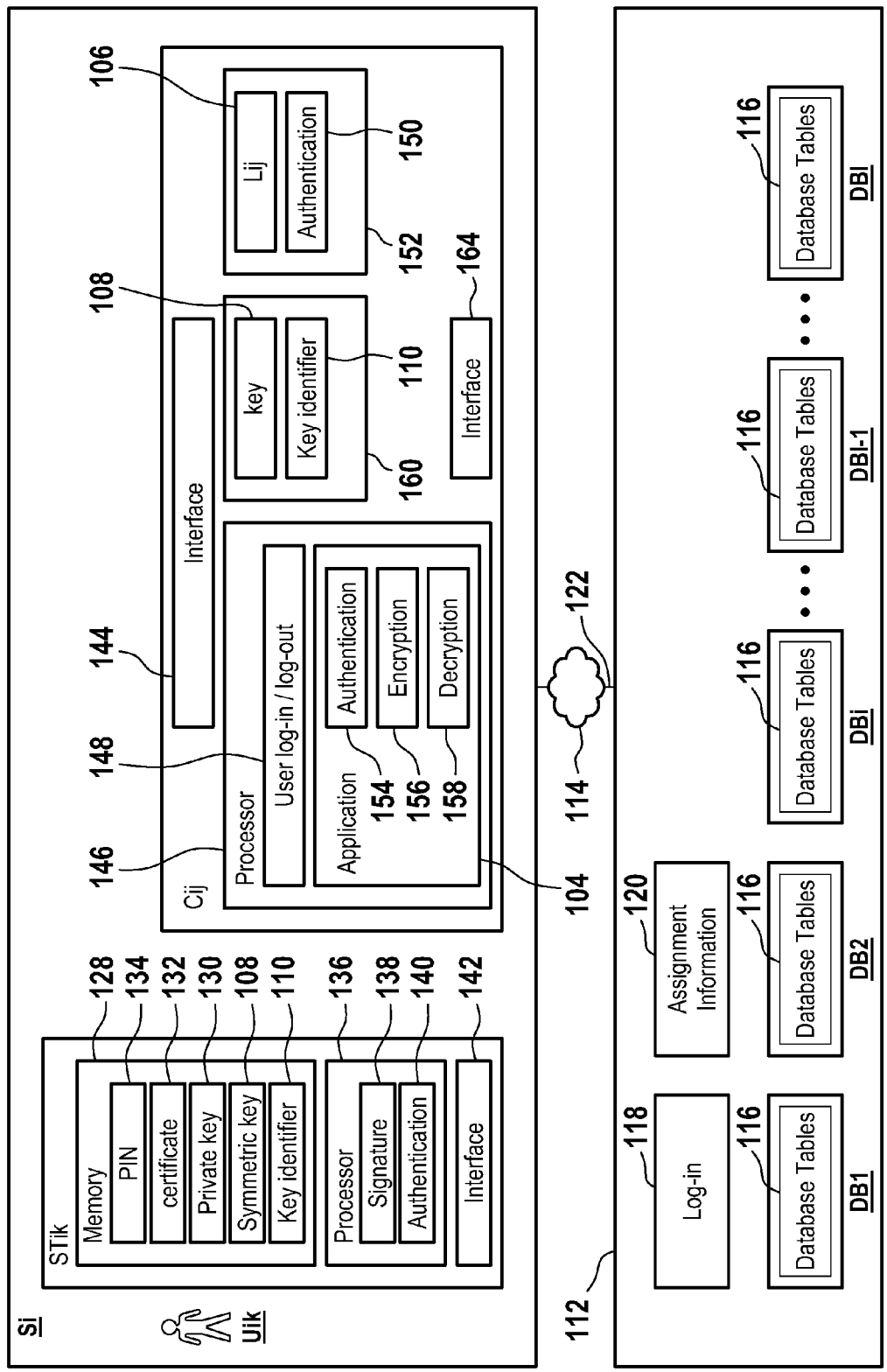
Figure 8:
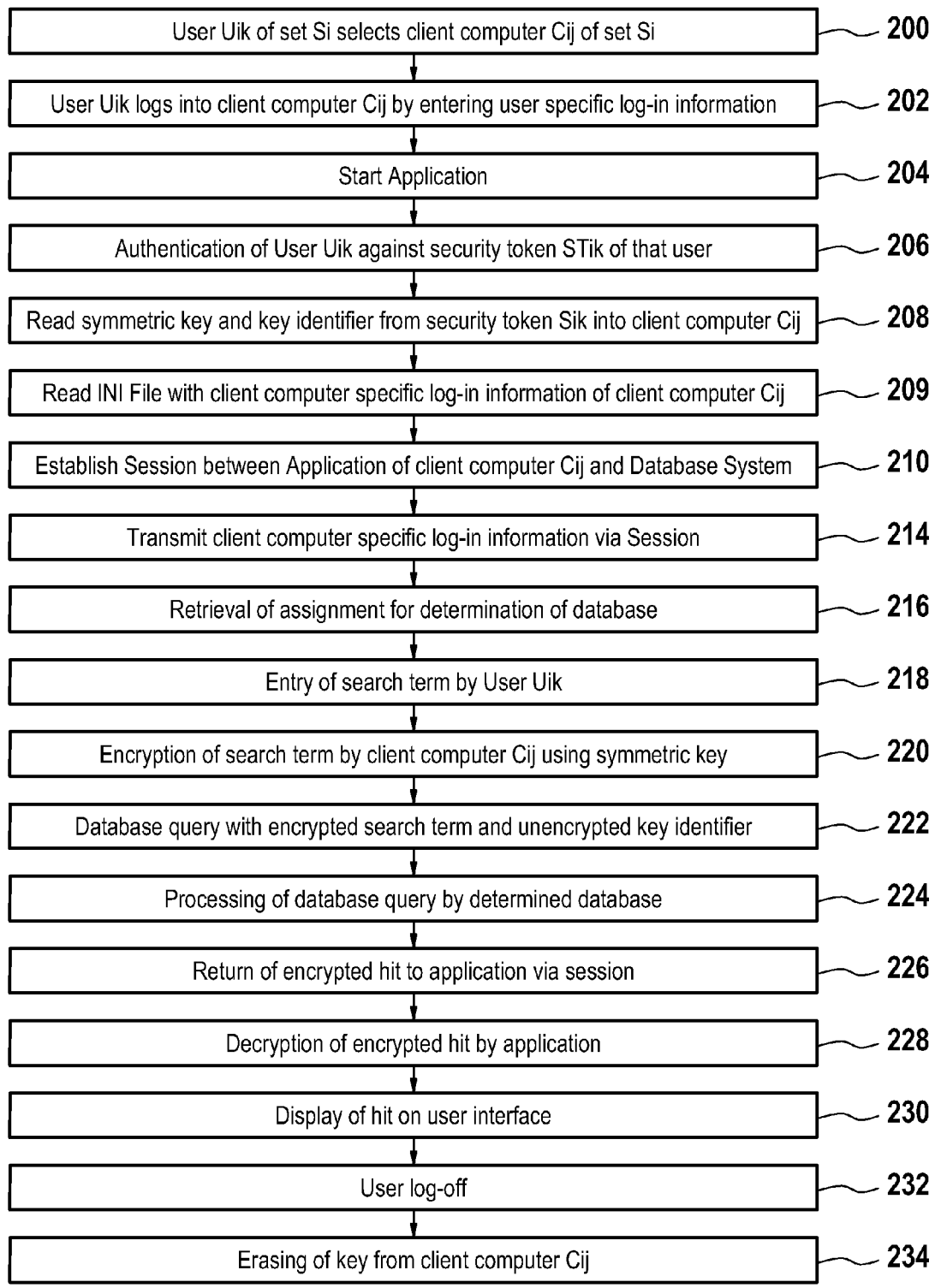
Figure 9:
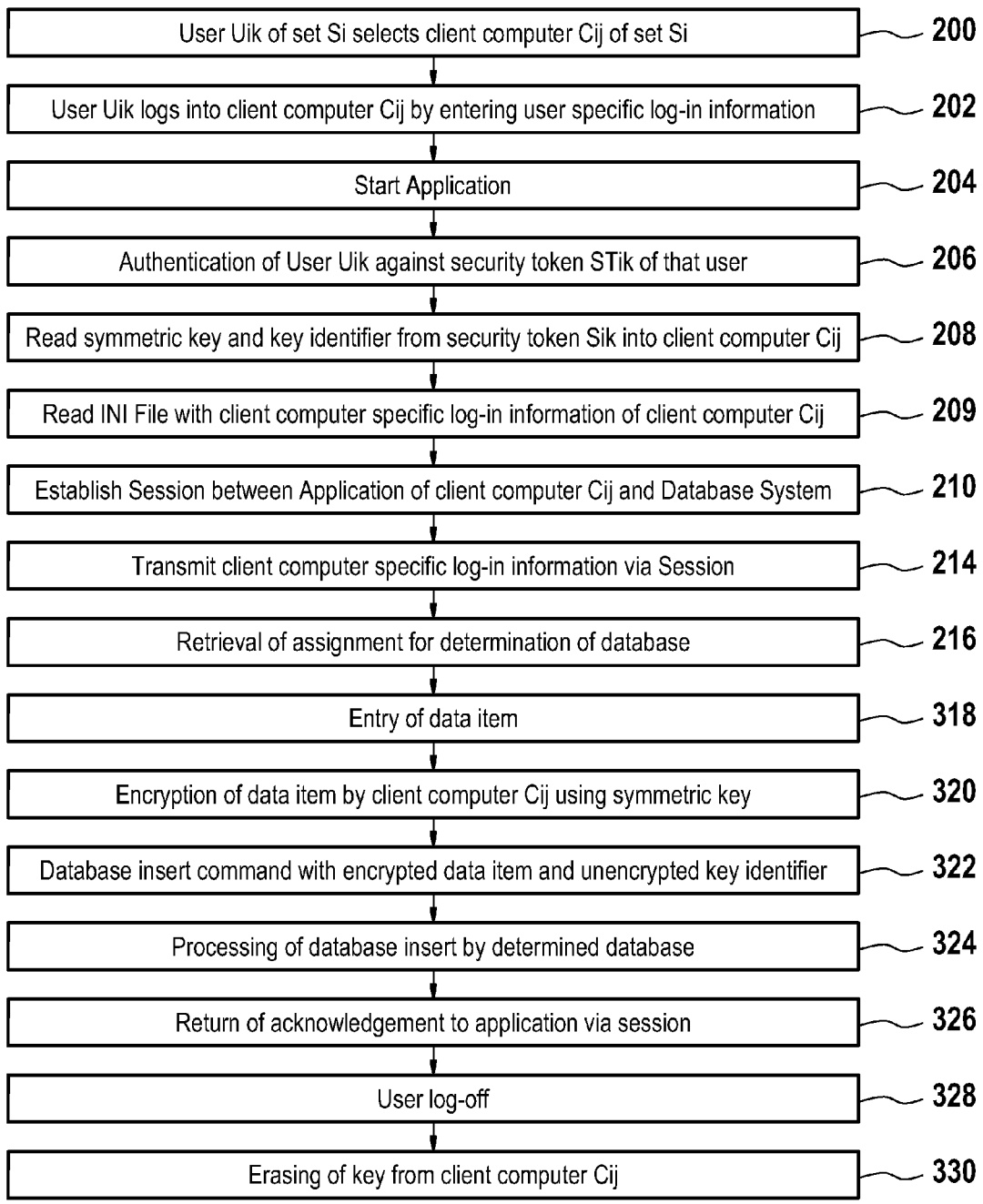

In the following, preferred embodiments of the invention are described in greater detail by way of example only using the following figures in which:

FIG. 1 illustrates a computer system for retrieval of data items,

FIG. 2 is a flow chart illustrating steps of retrieving data items from a database, FIG. 3 is a flow chart illustrating a method of updating a database with encrypted data items, FIG. 4 depicts a cloud computing node according to an embodiment of the present invention, FIG. 5 depicts a cloud computing environment according to an embodiment of the present invention, FIG. 6 is a block diagram of a computer system as described above, FIG. 7 is a more detailed block diagram being illustrative of a client computer system, FIG. 8 is a flow diagram illustrating a method for retrieval of an encrypted data item, FIG. 9 is a flow chart being illustrative for storing an encrypted data item in the database system.

Throughout the following description of various embodiments of the invention identical reference numerals are used for designating like or identical elements.

FIG. 1 illustrates a computer system comprising a client computer 10 and a database 30 stored on a server 22. The server 22 is coupled to the client computer 10 via a network 48. The database 30 comprises a first relation 36, which in the example of FIG. 1 is a table with three columns. Further, the database 30 comprises second relations 32 and 34 which are also tables in which each comprise two columns.

The client has a processor 12 and a memory, like for example a RAM memory 14. Further, the client 10 has a storage medium 16 stored thereon an application 17 and a symmetric key K 18. Similarly, the server 22 has a processor 26 and a volatile memory 28. It has to be noted here, that for the given examples the usage of a symmetric key is assumed. However, the explained concept is also applicable for usage of asymmetric key pairs instead of a symmetric key.

Without restriction to generality, in the following it is assumed that the computer system is located in a medical environment. For example, the client 10 may be part of a medical office or a hospital and the database 30 of the server 22 is located in an external database center, like a cloud computing center. Thus, the client 10 and the server 22 are located in different locations.

Also, without restriction to generality it is assumed that the first relation 36 stores as attributes last names in encrypted form (reference numeral 44) and first names in encrypted form (reference numeral 46). Thus, a search criterion w (reference numeral 19) may be a request for a certain patient name, for example a last name of a patient. In order to ease the handling of retrieval of patient records, at the reception desk of the medical office the secretary may wish to either type a patient's last name in the way it is spelled and/or without detail knowledge of the order of small and capital letters or the correct spelling of diacritical marks.

Since the client computer 10 and the server 22 are used for handling of medical data records, it is crucial that any information leaving the client and thus the environment of the medical office is safe. It has to be ensured that no unauthorized person may ever have access to the patient data records. This includes the administrator of the database 30 at the server 22. Therefore, any data communicated over the network 48 must be encrypted. The same holds for any data stored in the database 30.

In order to nevertheless permit performing a fast search with the search criterion 19 irrespective of spelling and/or writing, the following procedure is performed:

After receiving the search criterion 19 ($w$), the application 17 applies an equivalence relation f(w) to the search criterion which results in an equivalence class u. For example, in case the equivalence relation comprises a text normalization function, the search criterion w will be normalized to small letters only without any spaces or apostrophes. For example, if the search criterion w is a name O'Neil, it is irrelevant if the apostrophe is used or not used and it is irrelevant if capital or small letters are used to spell the name. The result of the normalization function will be the combination of letters 'oneil'. This equivalence class 'oneil' is then encrypted using the symmetric key 18, resulting in an encrypted equivalence class 20, given by $c\_u=C(u, K)$. The key K is a symmetric key.

The encrypted equivalence class 20 is then transmitted via the network 48 as a query to the server 22. After receiving the database query, the server applies the query to the second relation 34 for obtaining a matching equivalence class, which is in the present example is the equivalence class c_oneil. In the present example, the second relation 34 comprises as attribute 40 encrypted equivalence classes obtained by a text normalization function. Further, the second relation 34 comprises as an attribute 38 a referential connection to the first relation 36.

The database is operational to determine in the first relation 36 the encrypted data item c_O'Neil assigned to the matching equivalence class c_oneil using the referential connection fk1 of the matching equivalence class c_oneil. Thus, the determined encrypted data item comprises a combination of the encrypted first name and the encrypted last name, i.e. c_Brian and c_O'Neil. This combination is denoted by reference numeral 24 (c_v). c_v is then transmitted back to the client 10 via the network 48. Using its symmetric key 18, the client 10 is able to decrypt the received encrypted data item and display the full name (Brian O'Neil) for example on a computer screen of the client.

Alternatively or additionally, after receiving the search criterion 19, the application 17 may apply an equivalence relation to the search criterion which comprises a Soundex algorithm or a variant of a Soundex algorithm. The result is a classification of a search criterion with respect to its sounding, which is typically denoted by a letter followed by 3 digits. Using the above-described procedure, the equivalence relation comprising the Soundex algorithm may be applied to the search criterion for obtaining a search equivalence class u. This equivalence class is then encrypted with the symmetric key 18 and transmitted as c_u (20) via the network 48 to the server 22 as a query. The database query is then applied by the database 30 to the second relation 32 which comprises encrypted Soundex values as an attribute 40.

For example, in case the search criterion was a last name called "schmid", the Soundex algorithm may transform this last name to the value S123. Thus, the encrypted value is c_S123 which is comprised in the present example as an attribute value in the second relation 32. By applying the query to the second relation 32, the matching equivalence class c_S123 is obtained. Using the referential connection fk3 which assigns the c_S123 to the tuples of the encrypted names Michael Schmid, as well as Jane Schmidt ('Schmid' and 'Schmidt' sound similar and have assigned the same Soundex value S123), these tuples can be determined and provided in encrypted form to the client computer 10 as data 24. Then, the client computer 10 may decrypt these encrypted names using its symmetric key 18.

As illustrated with respect to the first relation 36, the first relation comprises the attributes 44 (encrypted name), 46 (encrypted first name), as well as an attribute 42 (k), which stores as attribute values key identifiers.

In a further example, the symmetric key 18 of client 10 may be associated with a key identifier which may uniquely identify the symmetric key. When generating the database query using the encrypted search equivalence class, the client may also include the key identifier of the symmetric key 18 in the query. When receiving the query, the database 30 may determine if the matching data items are designated with this key identifier. If this is not the case, the client 10 will not be able to decrypt the determined encrypted data items received via the network 48 as c_v (reference numeral 24). In this case, the database 30 may decide not to provide these encrypted data items to the client computer. Alternatively or additionally, it may be possible to assign these key identifiers as a further attribute to the second relation 32 and the second relation 34. In this case, an equivalence class in the second relation is only determined to be matching in case c_u matches one of the attribute values comprised in c_normalize or c_soundex as well as in case key identifier assigned to said matching equivalence class matches the key identifier received via the query from the client 10.

In either implementation, i. e. in case the key identifier is stored as an attribute with the first relation or a second relation, a large database can be used for different users or even different clients, which use different symmetric keys for data item encryption. Thus, with only a single common database, even with a single common first and second relation, it is possible to reliably ensure that data retrieval can only be performed by an authorized person in case this authorized person possesses the correct symmetric key 18. Unnecessary transmission of encrypted data items from the server 22 to the client 10 is avoided.

Even though the data stored in the first relation and in the second relation were explained as being encrypted with the same symmetric key, it has to be understood that this concept is also extendable to the scenario in which the key used for encrypting the equivalence classes and the key for encrypting the data items might be different. Also, the type of keys (symmetric or asymmetric) may differ for these keys.

FIG. 2 illustrates a flow chart of a method of querying by a client computer a database stored on a server. The method starts in step 50 with receiving a search criterion. In step 52, an equivalence relation is applied to the search criterion which results in an equivalence class. This equivalence class is then encrypted in step 54 with a symmetric key of the client. After generating a database query using the encrypted search equivalence class, the database query is entered in step 56 into the database stored on the server. Then, on the database side in step 58 the query is received and applied to the above-described second relation for obtaining a matching equivalence class. Further, in step 60 a referential connection for that matching equivalence class is obtained. In step 62, in the above-described first relation the encrypted data item is determined which is assigned to the matching equivalence class using the referential connection of the matching equivalence class. The result, i. e. the encrypted data item which was determined in step 62 is then provided in step 64 to the client. In step 66, an encrypted data item is received by the client and decrypted in step 68. The result is obtaining the data item in decrypted manner. The procedure ends in step 69.

FIG. 3 illustrates a flow chart for updating a database stored on a server, the database comprising the above-described first and second relation. The method starts in step 70 with receiving a new data item. In step 72, the equivalence relation is applied to the received data item which results in an equivalence class. This equivalence class is then encrypted in step 74 using the symmetric key of the client. Further, the data item is itself is also encrypted using the symmetric key of the client in step 76. Then, in step 78 both the encrypted data item as well as the encrypted equivalence class are transmitted to the database. The sending of the encrypted data item and the encrypted equivalence class may also comprise instructions for a referential connection association by the database. However, it is also possible that by providing the encrypted data item together with the encrypted equivalence class, the database is able to understand and determine that there is a relation between the encrypted equivalence class and encrypted data item thus automatically associating the referential connection between the encrypted data item and the encrypted equivalence class.

In step 80, the database is receiving the encrypted data and the instructions and determines in step 82, if the encrypted equivalence class is already stored in the second relation. The reason is that equivalence classes typically classify similar data items into a single class. Thus, there is a high probability that in a database with a large multitude of data items already similar data items and thus equal equivalence classes (in detail encrypted equivalence classes) are present in the database.

If in case in step 82 it is determined that the encrypted equivalence class is already stored in the database, in step 84 the existing equivalence class is updated with a referential connection associating the equivalence class additionally with the encrypted data item to be stored in the first relation. Further, the encrypted data item is stored in the first relation. The procedure then ends in step 88. However, in case it is determined in step 82 that the encrypted equivalence class is not yet existing in the second relation, the encrypted equivalence class is stored in the second relation, the encrypted data item is stored in the first relation and the encrypted equivalence class in the first relation is associated via a referential connection to the encrypted data item in the first relation. This is performed in step 86. Then, the procedure ends in step 88.

A cloud computing environment is service oriented with a focus on statelessness, low coupling, modularity, and semantic interoperability. At the heart of cloud computing is an infrastructure comprising a network of interconnected nodes. Referring now to FIG. 4, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016. Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 12 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Referring now to FIG. 5, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B and/or laptop computer 1054C. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

FIG. 6 shows a computer system 100 that comprises multiple sets of client computers, i.e. a number I of sets S1, S2, . . . Si, . . . SI-1, SI. Each one of the sets Si is located in a respective trusted environment 102 that is in some way access restricted. For example, the set S1 of client computers is located within trusted environment 102.1, set S2 of client computers in trusted environment 102.2, . . . set Si of client computers in trusted environment 102.i etc. such that there is a one-to-one relationship between sets Si of client computers and trusted environments 102.i. Alternatively at least one, some or all of the client computers are located outside a trusted environment, such as in a vehicle.

One of the trusted environments 102.i may be a medical practice or another enclosed area in a building, with restricted access. For example access into one of the trusted environments 102.i can be restricted by means of an electronic access control system and/or physical and/or organizational measures.

In the following the set Si of client computers is considered by way of example only and without restriction of generality: The set Si has a number of J client computers Ci1, Ci2, . . . Cij, . . . CiJ. On each one of the client computers Cij an application program 104 is installed that has a configuration file 106 storing client computer specific database log-in information Lij.

The database log-in information Lij of a given client computer Cij can be constituted by a 'username'/password combination or other authentication information. It is important to note that the 'username'/password combination or other authentication information is not assigned to an actual user but to the respective client computer Cij on which the application program 104 with the log-in information Lij is installed. Hence, 'username' does not refer to a user but to a specific client computer Cij.

The same applies analogously to the other sets of client computers where the number J of client computers per set can vary.

A group of a number K of authorized users Ui1, Ui2, Uik, . . . UiK has access to the trusted environment 102.i, where the number of authorized users K can be below, equal or greater than the number of client computers J. Each client computer Cij of the set Si is set up such that any one of that group of authorized users which are authorized with respect to the trusted environment 102.i can utilize any one of these client computers of set Si.

Each one of the authorized users Uik has an assigned security token STik, such as a chip card. Each one of the security tokens STik has a memory for storing a cryptographic key 108 and a key identifier 110 of the cryptographic key 108.

The key 108 of security token STik may be specific to the user Uik to which the security token STik is assigned such that all authorized users across all trusted environments 102 have different cryptographic keys 108. Alternatively, the cryptographic keys 108 are user-group specific. For example, a user-group is constituted by all users Ui1 to UiK of the trusted environment 102.i such that all authorized users of that trusted environment 102.i share the same cryptographic key 108. Alternatively, one or more subgroups of users of the group of authorized users of one of the trusted environments 102.i can be defined such that users of that sub-group share identical cryptographic keys 108.

The key identifier 110 can be a globally unique identifier (GUID) of the cryptographic key 108 such that any of the cryptographic keys 108 is unequivocally identified by its respective key identifier 110.

Each one of the sets of client computers is coupled to a database system 112 via a network 114, such as the internet. The database system comprises a number of I databases DB1, DB2, . . . , DBi, . . . , DBI-1, . . . , DBI. Each one of the databases may be a relational database comprising database tables 116. Each one of the databases is assigned to one of the sets of client computers such that there is a one-to-one relationship between databases and sets of client computers. In other words, the set Si of client computers is assigned to the database DBi.

By way of example one of the database tables 116 of the database DBi is shown in a schematic way:

| Encrypted data item | key identifier |
|---|---|
| c | GUID (key) |
| . . . | . . . | where c is an encrypted data item, i.e. a cipher text that has been obtained by encryption of the data item using the cryptographic key 108 that is identified by the GUID stored as an attribute of c in the database table 116. The database table 116 may be split into separate relational database tables depending on the implementation.

It is important to note that the key 108 itself is not stored anywhere in the database system 112 and that the database tables 116 merely comprise cipher text, key identifiers and digital signatures, depending on the implementation. Hence, confidentiality of the data that is stored in the database tables 116 of the database system 112 does not need to be ensured as all data items are stored in encrypted form and the key identifiers and digital signatures are stored as attributes of the cipher text but not the keys themselves.

The database system 112 has a log-in component 118 that serves for logging in the various client computers of the sets of client computers. The log-in component 118 has access to assignment information 120 that is stored in the database system 112. The assignment information 120 may be stored in tabular form using the log-in information Lij of the configuration files 106 for specifying the assignments of the sets of client computers to the databases. For example, the assignment information 120 may be stored in the following tabular form:

| Client specific log-in information | database |
|---|---|
| Lij | i |
| . . . | . . . |

In other words, each log-in information Lij is assigned to one of the databases DBi that is identified by its index i in the tabular assignment information 120. The assignment information 120 may be split into separate relational database tables depending on the implementation.

Without restriction of generality and by way of example the user Uik is considered in the following:

The user Uik enters the trusted environment 102.i. If the trusted environment 102.i has an electronic access control system the user Uik may utilize its security token STik for obtaining access to the trusted environment 102.*i* through the electronic access control system, such as by inserting the security token STik or bringing the security token STik into the proximity of a chip card reader of the electronic access control system.

The user Uik may then select any one of the client computers of the set Si, such as client computer Cij. Depending on the implementation, the client computer Cij may have a log-in component for logging in the user Uik.

In response to a respective command entered by the user Uik into client computer Cij the application program 104 establishes a network session, such as an internet session 122 with the database system 112. The application program 104 reads the log-in information Lij from its configuration file 106 and sends the log-in information Lij via the internet session 122 to the database system 112 where it is received by the log-in component 118.

The log-in component 118 searches the assignment information for a matching log-in information. If such a matching log-in information can be identified the respective assignment of the matching log-in information Lij to one of the databases DBi is read from the assignment information 120 and a database connection is established between that database DBi and the application program 104 of the client computer Cij.

The application program 104 reads the key 108 and the key identifier 110 from the security token STik of the user Uik and stores this information temporarily. This may require unlocking the security token STik by authentication of the user Uik against the security token STik, such as by entry of a PIN.

The user Uik may then enter the search criterion into the application program 104 of the client computer Cij, such as an unencrypted data item for which matching records that are stored in the database system 112 are to be retrieved. Upon entry of the data item the application program 104 encrypts the data item using the key 108. The application program 104 then generates a database query 124 that contains the encrypted data item as a search criterion and the key identifier 110 of the cryptographic key 108 as an additional search criterion in order to limit the search to such encrypted data items that have a matching key identifier attribute.

This database query 124 is transmitted via the database connection established over the internet session 122 to the database DBi that has been identified by the log-in component 118 as the database that is assigned to the set Si. The database DBi executes a search for data records that have encrypted data items that match the encrypted data item and which in addition have a matching key identifier, i.e. a matching GUID, for processing of the query 124. This limits the search results to data items that have been encrypted by the key 108.

These search results 126 are returned from the database DBi to the application program 104 of the client computer Cij. The application program 104 decrypts the encrypted data items contained in result 126 by means of the key 108 and outputs the decrypted data items such as on a display of the client computer Cij.

For storing a data item in the database system 112 a database connection is established as described above. The user Uik enters a data item to be stored into the application program 104 which encrypts the data item using the key 108 and generates a database insert command for writing the encrypted data item with the key identifier 110 as an attribute to the database DBi.

FIG. 7 shows a block diagram of a further embodiment of the invention. By way of example and without restriction of generality an arbitrary security token STik of a user Uik that has selected client computer Cij is shown in FIG. 7 whereby the other security tokens and client computers of the computer system 100 can be structurally identical or similar.

The security token STik has an electronic memory 128 for storing the cryptographic key 108 and the key identifier 110. Further, a private key 130 that belongs to an asymmetric cryptographic key pair assigned to the user Uik and the security token STik is stored in a secure storage area of the memory 128. A corresponding certificate 132 that contains the respective public key of the asymmetric cryptographic key pair may also be stored in the memory 128 or elsewhere.

The certificate 132 is a public key certificate that is also known as digital certificate that may be signed by a certificate authority within a public key infrastructure scheme. The certificate 132 may comply with any respective standard, such as X.509.

Further, authentication information 134 may be stored within a secure storage location of the memory 128, such as a personal identification number (PIN). Correct entry of the authentication information 134 into the security token STik may be required for unlocking the security token STik.

The security token STik has a processor 136 for execution of program modules 138 and 140. Further, the security token STik has a communication interface 142.

The program module 140 serves for authentication of the user Uik. For authentication the user Uik enters authentication information, such as a PIN, that the security token STik receives at its interface 142. By execution of the program module 140 the validity of the authentication information entered by the user Uik is checked by comparing it to the authentication information 134 that is stored in the memory 128. If the entered authentication information matches the authentication information 134 an authentication signal is generated by the program module 140 for unlocking the security token STik. This enables to read out the cryptographic key 108 and the key identifier 110 via the interface 142 and to request the generation of an electronic signature by execution of the program module 138 that uses the private key 130 for generating an electronic signature by the application program 104.

The client computer Cij has a communication interface 144 that is interoperable with the interface 142 of the security token STik. For example, the interfaces 142 and 144 are chip card interfaces or RF interfaces that comply with an RFID and/or NFC communication standard.

The client computer Cij has a processor 146 for execution of a program module 148 that may be part of the operating system and for execution of the application program 104 (cf. FIG. 6).

The program module 148 implements a log-in component that serves for logging in and logging out a user with respect to the client computer Cij. A user log-in may be performed by entering a username/password combination into the client computer Cij and matching that entered username/password combination with a respective authentication data 150 that contains the same username/password combination and which is stored in non-volatile memory 152 of the client computer Cij. Log-out may be performed automatically by the program module 148 when a timeout condition of extended user inaction is fulfilled.

The application program 104 comprises a program module 154 for authentication of the application program 104 and the client computer Cij on which it is installed vis-à-vis the database system 112. For that purpose the program module 154 is interoperable with the log-in component 118.

The application program 104 further comprises a program module 156 for encryption of a data item by means of the key 108 and a program module 158 for decryption of an encrypted data item using the key 108. The client computer Cij has a working volatile memory 160 for storing a copy of the cryptographic key 108 and its key identifier 110. A configuration file 106, such as a INI file, that contains the client computer specific log-in information required by the log-in component 118 is stored in the non-volatile memory 152.

Further, the client computer Cij has a network interface 164 for coupling the client computer Cij to the database system 112 via the network 114.

In operation the user logs into client computer Cij by entry of his or her username/password combination which is checked against the authentication data 150 stored in the memory 152 by the program module 148. If the entered username/password combination of the user Uik matches the authentication data 150 the user Uik is successfully logged into the client computer Cij. Execution of the application program 104 is started. This can be implemented by the standard Windows log-in if an Windows operating system is utilized on the client computer.

Next, the application program 104 prompts the user Uik to present his or her security token STik at the interface 144 such as by inserting the security token STik into a chip card reader of the client computer Cij. Next, the user Uik needs to authenticate vis-à-vis the security token STik for unlocking the security token. This is done by entry of the user's PIN into the security token STik either via the client computer Cij, via the chip card reader or directly into the security token STik depending on the implementation.

When the security token STik is unlocked the application program 104 generates a read command that is communicated via the interfaces 144 and 142 such as in the form of a command APDU for reading out the cryptographic key 108 and its key identifier 110. Copies of the key 108 and the key identifier 110 are then stored in the memory 160 by the application program 104.

Further, the application program 104 initiates the establishment of a database connection with the database system 112 by establishing the internet session 122, reading of the configuration file 106 that contains the client computer specific log-in information Lij by the program module 154 and sending the client computer specific log-in information Lij to the log-in component 118.

The log-in component 118 determines the database to which the set Si of client computers to which the client computer Cij belongs is assigned using the assignment information, i.e. by determining i from the tabular assignment information by means of the log-in information Lij contained in the configuration file 106 (cf. FIG. 6).

The database connection is then established between the application program 104 and the determined database, i.e. the database DBi, provided that the log-in information Lij is correct.

For retrieval of a data item or a data record that contains that data item the following steps are executed:
  The user Uik enters the data item as a search criterion into the application program 104.
  The application program 104 reads the key 108 from memory 160 and executes the program module 156 for encryption of the data item with the key 108 which provides the cipher text c.
  The application program 104 reads the key identifier 110 from the memory 160.
  The application program 104 generates a database query, such as an SQL query, containing the cipher text c and the key identifier 110 as search criteria and sends the database query via the database connection via the database connection that has been established over the internet session 122 to the database DBi.
  The database DBi executes the database query by searching for matching data records that contain the cipher text c and the key identifier 110. The database DBi then returns matching data items via the database connection to the application program 104.
  The application program 104 decrypts the returned data items by execution of the program module 158 using the cryptographic key 108 for decryption. If the data record contains a digital signature the validity of the digital signature is checked by the application program 104. The decrypted data records may then be displayed on a display of the client computer Cij. If the signature is invalid an error signal may be outputted.

For writing data to the database system 112 the following steps are performed after the database connection has been established:
  The user Uik enters at least one data item or a complete data record that contains this data item in one of its data fields into the application program 104.
  The application program 104 generates a command for generating a digital signature for the entered data item or data record which is sent via the interface 144 to the security token STik. For example, the application program 104 generates a hash value for the data item or the data record which is sent to the security token STik via the interface 144 for generating the signature by program module 138 using the private key 130.
  The application program 104 reads the cryptographic key 108 from the memory 160.
  The application program 104 encrypts the data item and other data contained in data fields of the data record, if any, by execution of the program module 156 using the cryptographic key 108.
  The application program 104 reads the key identifier 110 from the memory 160.
  The application program 104 generates a database insert command for writing the encrypted data item in conjunction with the key identifier 110 as an attribute and together with the digital signature to the database DBi.
  The database insert command is transmitted from the application program 104 via the database connection and executed by the database DBi. The database DBi returns an acknowledgement to the application program 104 after completion of the database insert operation.

It is important to note that the database DBi does not check the validity of the signature that it receives with the database insert command. Checking of the signature only occurs after retrieval of the encrypted data item or data record from the database DBi in the client domain, e.g. by client computer Cij, in the embodiment considered here.

FIG. 8 shows a flowchart of an embodiment of a method for retrieval of data from the database system 112.

In step 200 one of the users Uik that is an authorized user of the set Si of client computers that are within the trusted environment 102.i selects one of the client computers Cij of that set Si. In step 202 the user Uik logs into that client computer by entering user specific log-in information, such as his or her username/password or biometric information.

After successful log-in into client computer Cij the application program 104 is started in step 204. In step 206 the user Uik authenticates against his or her security token STik such as by entering his or her PIN. After successful authentication the security token STik is unlocked and the application program 104 can perform a read access onto the security token STik in step 208 for reading the cryptographic key 108 and its key identifier 110. The application program 104 stores copies of the cryptographic key 108 and the key identifier 110 in the working memory 160 of the client computer Cij.

The application program 104 reads the client computer specific log-in information Lij from its configuration file 106, such as its INI file (step 209). In step 210 the internet session 122 is established between the application program 104 and the database system 112 and transmits that log-in information Lij via the internet session 122 to the database system 112, namely its log-in component 118, in step 214.

The log-in component 118 uses the log-in information Lij for retrieval of the assignment of the client computer Cij from the assignment information 120 in step 216 in order to determine the database DBi to which the client computer Cij is assigned. The database connection is then established between that database DBi and the application program 104 over the internet session 122 if the database login operation has been successful.

For retrieval of a data item the user enters an unencrypted search term into the application program 104 in step 218. That search term is encrypted using the cryptographic key 108 in step 220 and a database query is generated in step 222 that contains the encrypted search term and in addition the unencrypted key identifier as an additional search criterion.

That database query is communicated to the database DBi via the database connection and processed by the database DBi in step 224. In response to the database query the database may return one or more encrypted hits to the application program 104, i.e. one or more data items that contain the encrypted search term, in step 226. In step 228 the returned search results are decrypted by the application program 104 using the cryptographic key 108 and the result of the decryption is displayed on a user interface in step 230. a digital signature that may also be returned by the database DBi is checked for validity. This may be a precondition for displaying the hit.

In step 232 a log-off condition is fulfilled, such that the user Uik is logged off from the client computer Cij. Such a user log-off may occur after an extended period of user inaction. As a consequence of the user log-off at least the key 108 is erased from the memory 160 of the client computer Cij in step 234.

FIG. 9 shows a method for writing data to the database system 112.

First, a database connection is established by execution of the steps 200-216 in the same or analogous way as described above with respect to the embodiment of FIG. 8.

Next, the user enters at least one data item in step 318 into the application program 104. The application program 104 encrypts the at least one data item in step 320 using the cryptographic key 108 and generates a database insert command in step 322. The database insert command comprises the at least one encrypted data item and the unencrypted key identifier 110 of the cryptographic key 108 with which the at least one data item has been encrypted; the database insert command can also comprise a digital signature.

The database insert command is communicated via the database connection to the database DBi which processes the database insert command in step 324. After the at least one encrypted data item has been written to the database table 116 of the database DBi together with the unencrypted key identifier and with a digital signature of the at least one data item, the database DBi returns an acknowledgement to the application program 104 in step 326.

Steps 328 and 330 are analogous to steps 232 and 234 of the FIG. 8 embodiment. In other words, when user log-off occurs at least the key 108 is automatically erased from the memory 160 without retaining a copy of that key 108 by the client computer Cij.

LIST OF REFERENCE NUMERALS 10 client
12 processor
14 memory
16 storage medium
17 application
18 symmetric key
19 search criterion
20 encrypted equivalence class
22 server
24 encrypted data item
26 processor
28 memory
30 database
32 second relation
34 second relation
36 first relation
38 attribute referential connection
40 attribute
42 attribute
44 attribute
46 attribute
100 computer system
102 trusted environment
104 application program
106 configuration file
108 symmetric key Cryptographic key
110 key identifier
112 database system
114 network
116 database table
118 log-in component
120 assignment information
122 internet session
124 query
126 result
128 memory
130 private key
132 certificate
134 authentication information
136 processor
138 program module
140 program module
142 interface
144 interface
146 processor
148 program module
150 authentication data
152 memory
154 program module
156 program module
158 program module
160 memory
164 network interface 1012 computer system/server
1010 cloud computing node
1016 processing units
1028 system memory
1018 bus
1028 memory
1016 processor
1030 random access memory (RAM)
1032 cache memory
1034 storage system
1042 program modules,
1050 cloud computing environment
1054A cellular telephone
1054B desktop computer
1054C laptop computer

The invention claimed is:

1. A computer system comprising a client computer and a database stored on a server, the server being coupled to the client computer via a network, wherein the database comprises a first relation and a second relation, wherein the first relation comprises first data items, wherein the first data items are encrypted with a first cryptographic key in the first relation, wherein the second relation comprises equivalence classes, wherein the equivalence classes are encrypted with a second cryptographic key in the second relation, the first and the second cryptographic key being identical, the second cryptographic key being associated with a first key identifier which uniquely identifies the second cryptographic key, wherein each equivalence class is a functional value of one of the first data items, the functional value being obtainable by applying an equivalence relation to the one of the first data items, wherein the second relation comprises for each equivalence class an allowed first key identifier and a referential connection assigning the equivalence class to the first data item stored encrypted in the first relation whose equivalence class is the functional value of said first data item, wherein the client computer has installed thereon an application program, the application program being operational to perform the steps of:

receiving a search criterion,
applying the equivalence relation to the search criterion for obtaining a search equivalence class,
encrypting the search equivalence class with the second cryptographic key,
generating a database query using the encrypted search equivalence class and an included first key identifier,
entering the database query into the database stored on the server,
in response to the query, receiving an encrypted first data item matching the equivalence relation of the search criterion,
decrypting the received encrypted first data item using the first cryptographic key, wherein the database is operational to perform the steps of:
receiving the database query,
applying the query to the second relation for obtaining a matching equivalence class,
determining in the first relation the encrypted first data item assigned to the matching equivalence class using the referential connection of the matching equivalence class, wherein the determining in first relation of the encrypted first data item assigned to the matching equivalence class is only performed in case the included first key identifier matches the allowed first key identifier for the matching equivalence class,
providing the determined encrypted first data item to the client computer.

2. The system of claim 1, wherein the first data items are tuples or attribute values of an attribute.

3. The system of claim 1, wherein the equivalence relation comprises a Soundex algorithm or a variant of a Soundex algorithm.

4. The system of claim 1, wherein the equivalence relation comprises a text normalization function.

5. The system of claim 1, wherein the equivalence relation comprises a truncation function for truncating a predefined portion of each of the first data items.

6. The system of claim 1, wherein database further comprises an index of the second relation, wherein the database is operational to apply the query to the second relation using the index of the second relation.

7. The system claim 1, wherein the database is a relational database.

8. The system of claim 1, wherein the client computer is a client computer of a multiple sets (S1, S2, . . . , Si, . . . , SI-1, SI) of client computers (Ci1, Ci2, . . . , Cij , . . . CiJ), each client computer having installed thereon the application program, the application program comprising client computer specific log-in information (Lij), wherein the system further comprises:

a database system, the database system comprising the database, the database system having a log-in component for logging-in the client computers, the database system being partitioned into multiple relational databases (DB1, DB2, . . . DBi, . . . DBI), each one of the databases being assigned to one set of the sets of client computers, each database storing encrypted data items, wherein the first data items are comprised in said data items, each data item being encrypted with a user or user-group specific cryptographic key, wherein the first cryptographic key corresponds to said user or user-group specific cryptographic key, the second key identifier of the cryptographic key with which one of the data items is encrypted being stored in the database as an attribute of the one of the encrypted data items, the log-in component comprising assignment information indicative of the assignment of the databases to the set of client computers, each one of the application programs being operational to perform the steps of:

a) establishing a network session with the database system over the network,
b) transmitting the client computer specific log-in information to the database system via the session,
c) receiving the key and the second key identifier by the client computer for use of the key by the client computer and without transmitting the key to the database system;
d) entry of a search criterion into the client computer,
e) generating a database query using the search criterion and the second key identifier, the second key identifier limiting the query to encrypted data items that have an attribute matching the second key identifier,
f) in response to the query, receiving at least one encrypted data item matching the search criterion from the database system,
g) decrypting the encrypted data item using the cryptographic key, the database system being operational to perform the steps of:
i) receiving the client computer specific log-in information via the session by the log-in component of the database system,
ii) determining one of the databases of the database system that is assigned to the client computer on which the application program is installed using the assignment information, by the log-in component of the database system, iii) entering the query received from the application program via the session into the database that has been determined using the log-in information for processing the query by that database.

9. The computer system of claim 8, wherein the query is generated by encrypting the search criterion with the entered key by the application program.

10. The computer system of claim 8, wherein the received key is erased from a memory of the client computer if any one of the following events occurs:

the application program which has received the key is closed;

the user is logged out from the client computer by a client log-in component after a timeout condition has been fulfilled;

the user session with the application program is timed out or closed by the user;

switching off a power supply of the client computer, exhausting the storage capacity of a battery that powers the client computer;

entry of a user command in response to which the key is erased.

11. The computer system of claim 8, each one of the application programs being operational for entry of a data item into the client computer, encrypting the data item with the key that has been received or derived by the client computer, generating a database insert command, the insert command comprising the encrypted data item and the second key identifier of the key with which the data item has been encrypted as an attribute of the encrypted data item for storing the encrypted data item in the database system with the second key identifier as an attribute, transmitting the insert command via the session to the database system for processing by the one of the databases that has been determined to be assigned to the client computer by the log-in component such that the encrypted data item with the second key identifier is stored in that database.

12. A method of querying by a client computer a database stored on a server, the server being coupled to the client computer via a network, wherein the database comprises a first relation and a second relation, wherein the first relation comprises first data items, wherein the first data items are encrypted with a first cryptographic key in the first relation, wherein the second relation comprises equivalence classes, wherein the equivalence classes are encrypted with a second cryptographic key in the second relation, the second cryptographic key being associated with a first key identifier which uniquely identifies the second cryptographic key, the first and the second cryptographic key being identical, wherein each equivalence class is a functional value of one of the first data items, the functional value being obtainable by applying an equivalence relation to the one of the first data items, wherein the second relation comprises for each equivalence class an allowed first key identifier and a referential connection assigning the equivalence class to the first data item stored encrypted in the first relation whose equivalence class is the functional value of said first data item, the method comprising at the client computer:

receiving a search criterin, applying the equivalence relation to the search criterion for obtaining a search equivalence class, encrypting the search equivalence class with the second cryptographic key, generating a database query using the encrypted search equivalence class and an included first key identifier, entering the database query into the database stored on the server, in response to the query, receiving an encrypted first data item matching the equivalence relation of the search criterion, decrypting the received encrypted first data item using the first cryptographic key, the method further comprising at the server:

receiving the database query, applying the query to the second relation for obtaining a matching equivalence class, determining in the first relation the encrypted first data item assigned to the matching equivalence class using the referential connection of the matching equivalence class, wherein the determining in first relation of the encrypted first data item assigned to the matching equivalence class is only performed in case the included first key identifier matches the allowed first key identifier for the matching equivalence class, providing the determined encrypted first data item to the client computer.

* * * * *

UNITED STATES PATENT AND TRADEMARK OFFICE
CERTIFICATE OF CORRECTION

PATENT NO.        : 9,558,366 B2
APPLICATION NO.   : 14/275486
DATED             : January 31, 2017
INVENTOR(S)       : Adrian Spalka and Jan Lehnhardt It is certified that error appears in the above-identified patent and that said Letters Patent is hereby corrected as shown below:

In the Claims

At Column 32, Line 18, please correct "criterin" to be --criterion--

Signed and Sealed this
Ninth Day of May, 2017

Michelle K. Lee
*Director of the United States Patent and Trademark Office*